United States Patent
Unlu et al.

(10) Patent No.: US 8,895,196 B2
(45) Date of Patent: Nov. 25, 2014

(54) ELECTROCHEMICAL DEVICES BASED ON MULTIPLE JUNCTION IONIC CONDUCTIVE MEMBRANES

(75) Inventors: Murat Unlu, Doraville, GA (US); Paul Kohl, Atlanta, GA (US); Hyea Kim, Atlanta, GA (US); Junfeng Zhou, Atlanta, GA (US); Irene Anestis-Richard, Villa Rica, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 466 days.

(21) Appl. No.: 13/496,677

(22) PCT Filed: Sep. 24, 2010

(86) PCT No.: PCT/US2010/050140
§ 371 (c)(1),
(2), (4) Date: Mar. 16, 2012

(87) PCT Pub. No.: WO2011/038190
PCT Pub. Date: Mar. 31, 2011

(65) Prior Publication Data
US 2012/0178000 A1 Jul. 12, 2012

Related U.S. Application Data

(60) Provisional application No. 61/245,494, filed on Sep. 24, 2009.

(51) Int. Cl.
*H01M 8/16* (2006.01)
*H01M 8/10* (2006.01)

(52) U.S. Cl.
CPC ........... *H01M 8/1023* (2013.01); *Y02E 60/527* (2013.01); *H01M 8/16* (2013.01); *H01M 2300/0082* (2013.01); *H01M 8/1039* (2013.01); *Y02E 60/521* (2013.01)
USPC .......................................................... 429/401

(58) Field of Classification Search
USPC ........................................................ 429/401
See application file for complete search history.

(56) References Cited

U.S. PATENT DOCUMENTS

2009/0263699 A1* 10/2009 Sadasue et al. ................. 429/30

* cited by examiner

*Primary Examiner* — Patrick Ryan
*Assistant Examiner* — Lucas J O Donnell
(74) *Attorney, Agent, or Firm* — Bryan W. Bockhop; Bockhop & Associates, LLC

(57) ABSTRACT

A fuel cell (100) includes a cation exchange membrane (110), a first anion exchange membrane (120) and a second anion exchange membrane (130). The cation exchange membrane (110) has a first side and an opposite second side. The first anion exchange membrane (120) has a first exterior surface and an opposite first interior surface disposed along at least a portion to the first side of the cation exchange membrane (110). A catalyst (140) is embedded along the first exterior surface. The second anion exchange membrane (130) has a second exterior surface and an opposite second interior surface disposed along at least a portion to the second side of the cation exchange membrane (110). A catalyst (142) is embedded along the second exterior surface. A stack of fuel cells (700) include a first fuel cell (701) with an acidic first anode (714) that is electrically coupled to an alkaline second cathode (722) of a second fuel cell (720).

11 Claims, 3 Drawing Sheets

ELECTROCHEMICAL DEVICES BASED ON MULTIPLE JUNCTION IONIC CONDUCTIVE MEMBRANES

STATEMENT OF GOVERNMENT INTEREST

This invention was made with government support under contract No. W19CRB-06-D-0032, awarded by the U.S. Army. The government has certain rights in the invention.

BACKGROUND OF THE INVENTION

1. Field of the Invention

The present invention relates to fuel cells and, more specifically, to fuel cells employing ion exchange membranes.

2. Description of the Related Art

Among the various types of fuel cells, the proton-exchange membrane (PEM) fuel cell has several desirable features including well established membranes and cell designs. Although PEM fuel cells have been used in numerous applications, there are several obstacles that impede wide scale commercialization. These issues include the high cost of noble-metal catalysts and perfluorinated membranes, carbon monoxide poisoning, and limited lifetime due to membrane and electrode degradation.

Recently, the anion exchange membranes (AEM) have been employed to make anionic fuel cells. Although AEM technology is not yet as mature as PEM, AEM technology is promising because it could address several drawbacks with PEM fuel cell. The high pH environment in AEM fuel cell provides faster kinetics for both oxygen reduction and methanol oxidation, which allows non-Pt catalysts such as silver and nickel to be used. Also, methanol crossover is expected to be lower due to the opposite direction of electro-osmotic drag. The high pH environment also addresses many of the shortfalls experienced with PEM fuel cells. Alkaline cells can employ catalysts such as nickel and silver, rather than the considerably more expensive platinum used in most low pH fuel cells. Alkaline cells are also resistant to CO poisoning.

Although AEM fuel cells have several advantages compared to proton based fuel cells, the lower ionic conductivity of AEM's compared to commercially available PEM's (such as Nafion®) is a concern because it may lower the performance. Moreover, the strong dependence of the AEM conductivity on humidity and the need for water in the cathode reaction are significant challenges that limit the performance of current AEM fuel cells.

Another aspect of fuel cells is that they can have high energy density when liquid fuels are used. Direct methanol fuel cells (DMFCs) have several key advantages compared to other power sources. The high theoretical energy density of methanol (6100 Wh/kg at 25° C.) may lead to small volume, long-life sources. The passive DMFC system, operating at atmospheric pressure and ambient temperature (20° C. to 60° C.), has a simple design, high energy efficiency, and minimal balance of plant. In addition, the liquid fuel is easy to store and handle In order to achieve higher voltage than values obtained from a single fuel cell, and high power-density, multiple fuel cells can be connected in series in a stack. Several different types of stack design for proton exchange membrane (PEM) fuel cell have been studied. The bipolar stack connects the anodes and cathodes in series through a metallic bipolar plate, which also serves as a fuel distribution channel. Another design is a monopolar stack where multiple anodes are serviced by the same fuel supply. The series connection is accomplished by electronically connected to the cathode of the next cell in a series configuration. Although it has attractive features, such as light weight and low cost, it was hard to achieve high power due to the high internal resistance. Moreover, in case of DMFC application, there is a concern about possible electrolysis of the water in the fuel, because more than 1.2V could be produced with several electrodes sharing the same fuel tank.

One system includes a bi-cell stack design (or pseudo bipolar), in which each unit consists of two PEM single cells. The two anodes ($A_1$ and $A_2$) operate with a common fuel source or channel, and the cathode ($C_2$) faces the cathode ($C_3$) in the next bi-cell unit. The anode ($A_x$) is electronically connected to the next cell's cathode ($C_{x+1}$) to form a series connection. It is easy to assemble the stack and the overall volume is smaller than the normal bi-polar stack due to the common fuel tank. Also, the bi-cell design reduces the need for expensive bipolar plates.

However, there is a potential difference between anode $A_1$ and cathode $C_2$. When these two electrodes are shorted together in the series configuration, the liquid methanol fuel provides an ionic path for anode $A_1$ to act as the anode to cathode $C_2$. Since $A_1$ and $C_2$ are electrically shorted, no electrical current flows in the external circuit as a result of this electrochemical reaction. Under acidic conditions, the standard potential for the two electrochemical reactions is given in Equations 1 and 2, respectively, and the overall reaction is given by Equation 3.

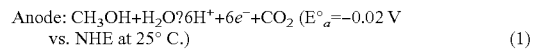

Anode: $CH_3OH + H_2O \rightarrow 6H^+ + 6e^- + CO_2$ ($E°_a = -0.02$ V vs. NHE at 25° C.) (1)

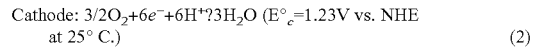

Cathode: $3/2 O_2 + 6e^- + 6H^+ \rightarrow 3H_2O$ ($E°_c = 1.23$V vs. NHE at 25° C.) (2)

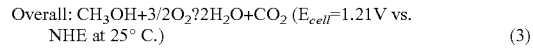

Overall: $CH_3OH + 3/2 O_2 \rightarrow 2H_2O + CO_2$ ($E_{cell} = 1.21$V vs. NHE at 25° C.) (3)

Thus, the origin of this electrochemical short circuit between anode $A_1$ and cathode $C_2$ is field developed between the electrodes and ionic path through the liquid methanol. This results in a self-discharge mechanism and loss of fuel efficiency. This same short circuit can also occur in the monopolar stack, since the anode in one cell is shorted to the cathode in the next cell and the two are ionically connected through the common methanol fuel tank. The magnitude of the undesired proton transport through the fuel tank could be lessened by spacing the cells farther apart or forming an insulating barrier between adjacent cells; however, this would be at the expense of compact designs.

Therefore, there is a need for fuel cells that have high ionic conductivity that can also employ less expensive catalysts and resist CO poisoning.

There is also a need for fuel cells stacks that limit self-discharge.

SUMMARY OF THE INVENTION

The disadvantages of the prior art are overcome by the present invention which, in one aspect, is a fuel cell that includes a cation exchange membrane, a first anion exchange membrane and a second anion exchange membrane. The cation exchange membrane has a first side and an opposite second side. The first anion exchange membrane has a first exterior surface and an opposite first interior surface disposed along at least a portion to the first side of the cation exchange membrane. A catalyst is embedded along the first exterior surface. The second anion exchange membrane has a second exterior surface and an opposite second interior surface disposed along at least a portion to the second side of the cation exchange membrane. A catalyst is embedded along the second exterior surface.

In another aspect, the invention is a stack of fuel cells, that includes an acidic fuel cell, an alkaline fuel cell and a fuel channel. The acidic fuel cell includes a first cathode and an oppositely disposed first anode. The alkaline fuel cell is spaced apart and parallel to the acidic fuel cell. The alkaline fuel cell includes a second anode and an oppositely disposed second cathode. The second cathode is in electrical communication with the first anode of the acidic fuel cell. The fuel channel is defined between the first anode of the acidic fuel cell and the second anode of the alkaline fuel cell.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
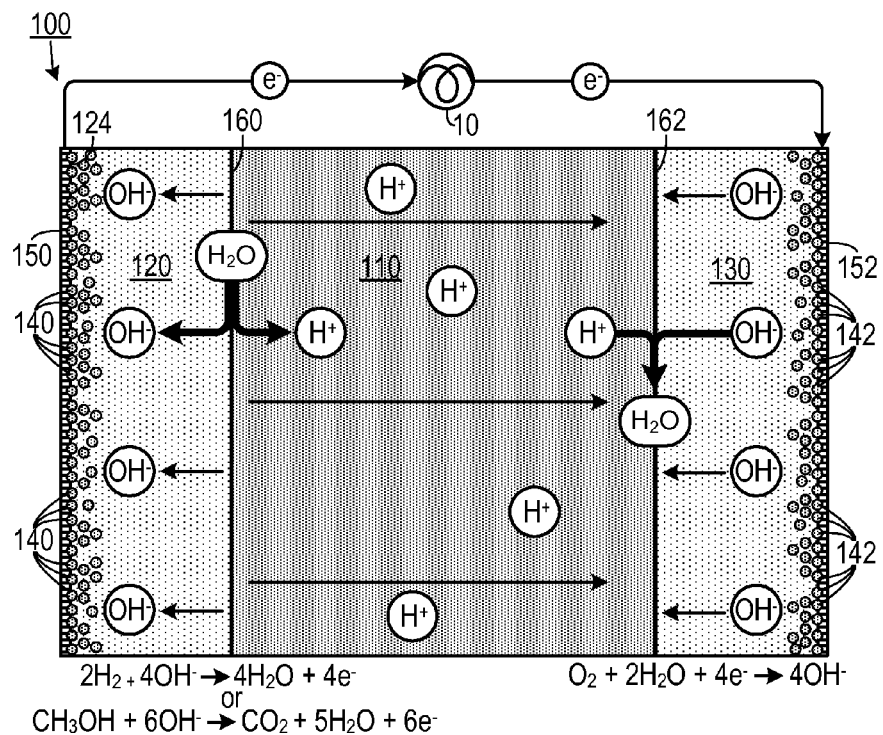
FIG. 1 is a schematic diagram of one embodiment of an AEM-PEM-AEM fuel cell.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of a hybrid fuel cell 100 includes a cation exchange membrane 110 that is sandwiched between a first anion exchange membrane 120 and a second anion exchange membrane 130. A catalyst 140 is embedded along an exterior surface of the first anion exchange membrane 120. A catalyst 142 is also embedded in the exterior surface of the second anion exchange membrane 130. A first conductive mesh 150 may be disposed along the first exterior surface of the first anion exchange membrane 120 to act as an anode and a second conductive mesh 152 is disposed along the second exterior surface of the second anion exchange membrane 130 to act as a cathode. The conductive meshes 150 and 152 act as electrodes between the fuel cell 100 and a load 10. A fuel channel is disposed adjacent to the first conductive mesh 150 and an oxidant channel is disposed adjacent to the second conductive mesh 152.

In a typical embodiment, the cation exchange membrane 110 includes a material such as a polymer including a sulfonic group attached thereto (e.g., a sulfonated tetrafluoroethylene based fluoropolymer-copolymer membrane, such as Nafion®), a composite, or a combination of these materials. The first conductive mesh 150 and the second conductive mesh 152 could include a material such as a carbon paper, a carbon cloth, a metal mesh, or a combination of these materials. In one embodiment, the catalysts 140 and 142 include particles of a metal supported by carbon, such as platinum supported by carbon (available from Johnson Matthey, Inc., 435 Devon Park Dr., Ste. 600, Wayne, Pa. 19087). In other embodiments, the metal could include palladium, silver, nickel and alloys of these metals. In certain embodiments, the catalyst could include an enzymatic moiety.

Two junctions are formed in this fuel cell 100: Junction 1 160 between the first anion exchange membrane 120 (the anode) and the cation exchange membrane 110; and Junction 2 162 between the second anion exchange membrane 130 (the cathode) and the cation exchange membrane 110.

The cell reactions at the electrodes and resulting ion movements are different than those of acidic proton exchange membrane fuel cells (PEMFCs). $OH^-$ is the product of oxygen reduction in the anion exchange cathode. $H^+$ and $OH^-$ ions are migrated to the interface of the membrane and cathode (Junction 2 162), forming water. Water, produced at the interface, is used as fuel in the cathode layer.

| Cathode | $O_2 + 2H_2O + 4e^- \rightarrow 4OH^-$ |
| Junction 2 | $4OH^- + 4H^+ \rightarrow 4H_2O$ |

At the anion exchange anode, the anode reactions are as follows:

| Anode | $H_2 + 2OH^- \rightarrow 2H_2O$ |
| Junction 1 | $2H_2O \rightarrow 2OH^- + 2H^+$ |

$OH^-$ ions are consumed in $H_2$ oxidation at the anode and are transported from Junction 1 160 towards the anode. $H^+$ ions in the cation exchange membrane 110 are migrated from Junction 1 160 towards the cathode. As a result of opposite ion movements at the Junction 1 160, a potential gradient is created that leads to a water splitting. The resulting $OH^-$ ions move towards to the anode through anion conductive ionomer 120 and $H^+$ ions are transported towards the cathode through the cation exchange membrane 110.

Figure 2:
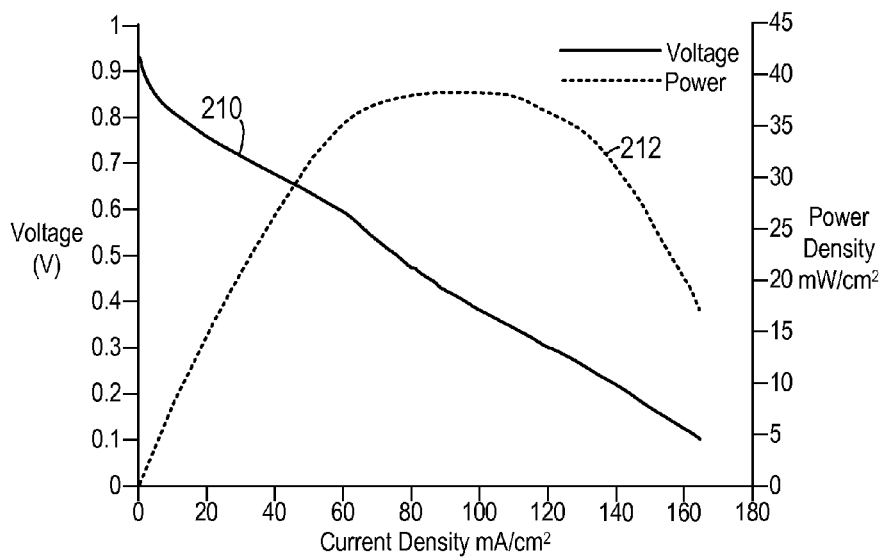
FIG. 2 is a chart relating voltage and power density to current density in an AEM-PEM-AEM fuel cell.

Voltage 210 and power 212 results (versus current density) for one experimental embodiment of a fuel cell are shown in FIG. 2. The open circuit voltage was 928 mV and maximum power density was 38 mW/cm2. A constant voltage test at 600 mV shows steady-stale operation at 50 mA/cm$^2$.

There are many advantages of this type of electrochemical device compared to traditional PEM and AEM fuel cells. For example, both fuel oxidation and oxygen reduction are faster in alkaline conditions (in the anion exchange membrane) than in acidic conditions (in the cation exchange membrane). The fast reactions increase cathode and anode current density and improve the output voltage compared to conventional PEM fuel cells. Also, the metallic catalyst at the electrodes under alkaline conditions (at the anion exchange membrane) can be nickel or silver, rather than just platinum. As platinum is extremely expensive, use of nickel or silver could significantly reduce the cost of the fuel cell. Additionally, PEMFCs typically suffer from the problems of CO poisoning in the anode catalyst (as a result of residual CO in the fuel from the petroleum reformation). Since CO oxidation occurs at a lower potential in alkaline conditions than in acidic conditions (e.g., at a PEM electrode), the hybrid cell can be more resistant to CO poisoning. The cathode is more durable than in a PEM cell. Normally, under PEM conditions, the platinum is oxidized and dissolves into the membrane, where it is redeposited. Under alkaline conditions, the cathode material does not form a soluble anion so that it remains stable giving the fuel cell a longer life. Another advantage of the hybrid fuel cell, is faster oxidation of liquid fuels, such as methanol, ethanol and other small organic molecules. The use of a selective catalyst in the cathode can eliminate power loss due to fuel crossover. For example, silver selectively catalyzes oxygen reduction but does not oxidize methanol. Also, fuel crossover is suppressed in the anode and cathode layer because OH⁻ ions flow opposite to fuel crossover in the catalyst layers. Such reaction selectivity and suppressed fuel crossover improves direct small molecule fuel cell performance. Hybrid fuel cells also offer improved water management compared to conventional PEM and AEM fuel cells. Water, which is formed at the interface of the membrane and anion exchange cathode, is used as a reactant in the cathode reaction. This internal circulation can result in operation at lower relative humidity, eliminating humidifier requirements, particularly for portable applications.

Figure 3:
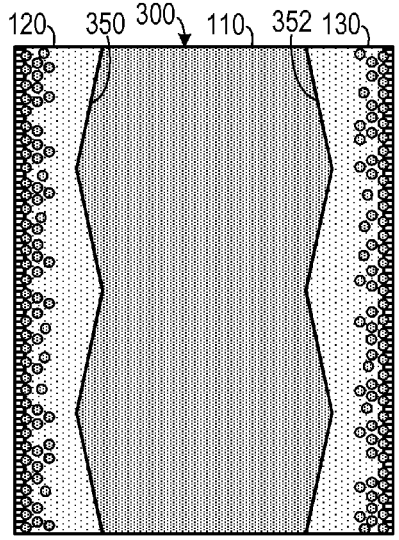
FIG. 3 is a schematic diagram of a first embodiment of an AEM-PEM-AEM fuel cell employing non-planar membrane interfaces.
Figure 4:
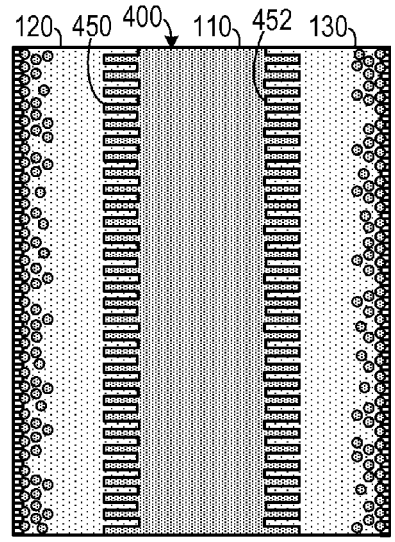
FIG. 4 is a schematic diagram of a second embodiment of an AEM-PEM-AEM fuel cell employing non-planar membrane interfaces.
Figure 5:
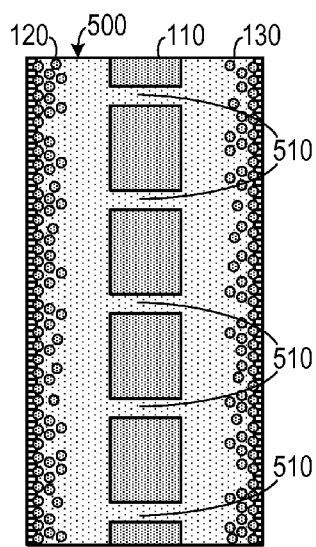
FIG. 5 is a schematic diagram of an embodiment of an AEM-PEM-AEM fuel cell employing AEM return channels.
Figure 6:
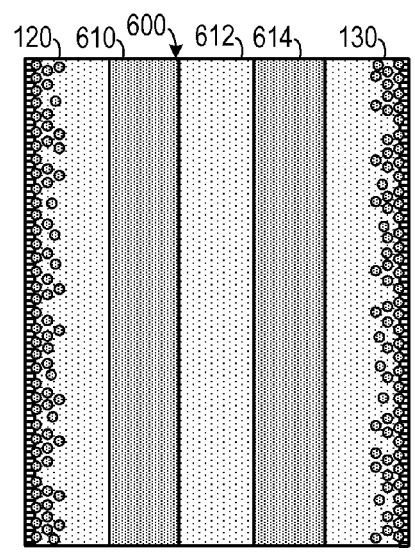
FIG. 6 is a schematic diagram of an embodiment of an AEM-PEM-AEM-PEM-AEM fuel cell.

A fuel cell 300 having non-planar membrane junctions 350 and 352 is shown in FIG. 3. Another fuel cell 400 in which the membrane junctions 450 and 452 are feathered is shown in FIG. 4. One embodiment of a fuel cell 500 in which small holes 510 are punched through the cation exchange membrane 110 is shown in FIG. 5. A multilayered fuel cell 600 is shown in FIG. 6. This embodiment includes two layers of cation exchange membrane 610 and 614 separated by a layer of anion exchange membrane 612. This added separation may reduce fuel crossover in the fuel cell 600.

Figure 7:
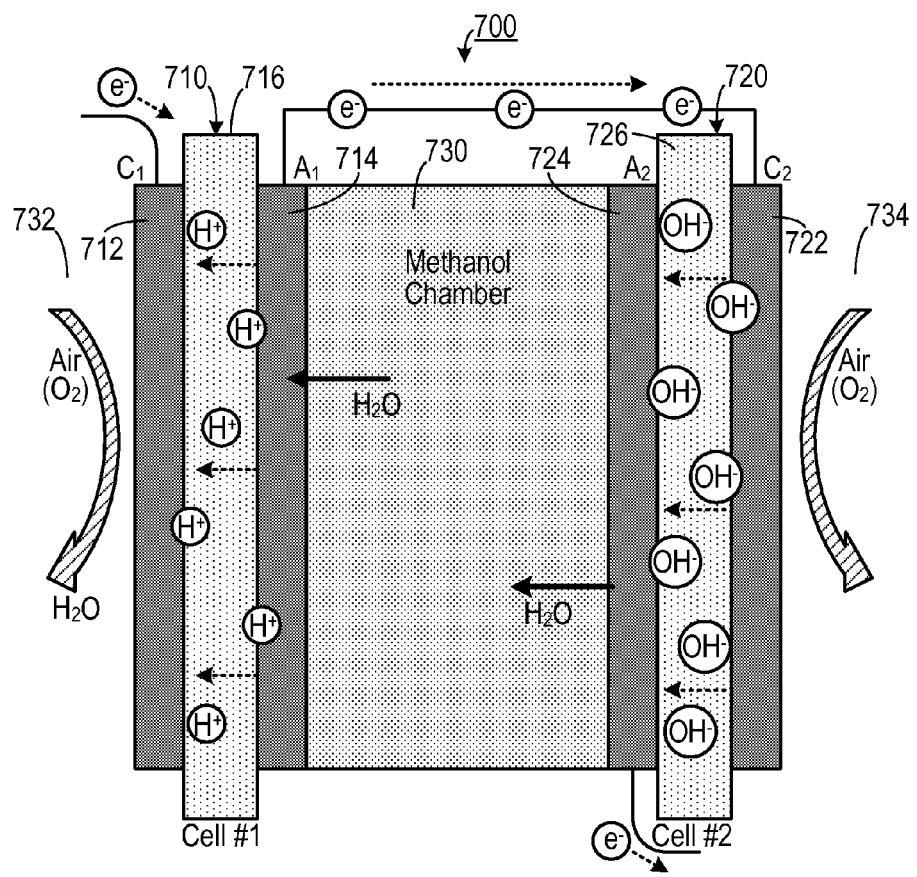
FIG. 7 is a schematic diagram of an embodiment of an fuel cell stack.

As shown in FIG. 7, a fuel cell stack 700 includes a first fuel cell 710 spaced apart from a second fuel cell 720 by a fuel channel 730. The fuel cell 710 includes a first cathode 712 and an oppositely disposed acidic first anode 714, which are disposed about a central ion exchange membrane 716 The second fuel cell 720 includes a second anode 724 and an oppositely disposed alkaline second cathode 722 disposed about a central ion exchange membrane 726. The alkaline second cathode 722 is in electrical communication with the acidic first anode 714 of the first fuel cell 710. The acidic first anode 714 of the first fuel cell 710 includes a proton exchange membrane. The first cathode 712 can include either a proton exchange membrane or an anion exchange membrane. Similarly, the alkaline second cathode 722 of the second fuel cell 720 includes an anion exchange membrane, whereas the second anode 724 of the second fuel cell can include either a proton exchange membrane or an anion exchange membrane.

A first oxidant passage 732 is disposed adjacent to the first cathode 712 of the first fuel cell 710 and a second oxidant passage 734 is disposed adjacent to the alkaline second cathode 722 of the second fuel cell 720.

The fuel cell reactions for one embodiment of a fuel cell are shown in Equations 4, 5 and 6.

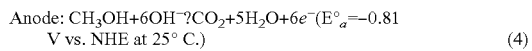

Anode: $CH_3OH + 6OH^- \rightarrow CO_2 + 5H_2O + 6e^-$ ($E°_a = -0.81$ V vs. NHE at 25° C.) (4)

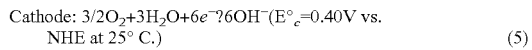

Cathode: $3/2 O_2 + 3H_2O + 6e^- \rightarrow 6OH^-$ ($E°_c = 0.40$ V vs. NHE at 25° C.) (5)

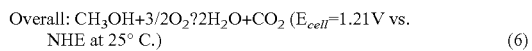

Overall: $CH_3OH + 3/2 O_2 \rightarrow 2H_2O + CO_2$ ($E_{cell} = 1.21$ V vs. NHE at 25° C.) (6)

In the alkaline fuel cell, the potentials are shifted to more negative values as a result of the high pH. The potential difference between the anode $A_1$ and cathode $C_2$ of the all PEM bi-cell design can be changed by combining an AEM cell with a PEM cell. Because cell #2 is an alkaline cell, then the cathode of cell #2 is shifted to a more negative potential, as compared to the acid fuel cell case discussed above (compare Eq. 2 above to Eq. 5). The cathode of cell #2, $C_2$ is closer in potential to that of the anode of cell #1, $A_1$.

In one experimental embodiment, the performance of the PEM-AEM bi-cell was investigated with a fuel wicking material. In this embodiment, the PEM electrode was made with Nafion ionomer (5 wt % suspension), 40 wt % Pt/C catalyst for cathodes, and 60 wt % PtRu/C for anodes. The catalyst ink was prepared by mixing the catalyst, water (75 mg), Nafion ionomer and isopropyl alcohol (1:5 by mass of catalyst and ionomer to isopropyl alcohol). The catalyst ink was sonicated for 30 minutes and then sprayed onto hydrophobic carbon paper (TGPH-090) for the cathode, and hydrophilic carbon paper (2050 L) for the anode. The electrodes had a surface area of 2 cm² and the metal loading was 4.0 mg cm⁻². Nafion 117 was pretreated with 3% $H_2O_2$, 1 M $H_2SO_4$, and water at 80° C., each for one hour. The electrode was pressed onto Nafion 117 at 2 MPa gauge pressure and 135° C. for 3 min.

The AEM electrode was made using an AEM ionomer, poly(arylene ether sulfone) functionalized with quaternary ammonium groups. Two different ionomers with different ion exchange capacity (IEC), L-AEM (low IEC AEM) and H-AEM (high IEC AEM), were used in this embodiment. The AEM ionomer was diluted to 5 wt % with dimethyl formamide (DMF). The catalyst ink for the AEM electrode was prepared by mixing the catalyst, water, AEM ionomer and a mixture of DMF (400 mg) and methanol (300 mg). The catalyst ink was sonicated for 30 minutes and sprayed onto the carbon paper, as described above for the PEM electrodes. Also, the resulting AEM electrodes had the same surface area and metal loading as the PEM electrodes. Before fabricating a membrane electrode assembly (MEA), the AEM electrodes and membrane were immersed in aqueous 0.1 M KOH to exchange OH⁻ for Cl⁻. The AEM electrodes were then pressed onto the membrane at 0.5 MPa and 50° F. for 20 min. For half-cell MEA tests, a commercial Tokuyama AMX membrane was used. For performance test, H-AEM membrane was used and the membrane thickness was 140 μm.

The electrochemical experiments were performed with a PARSTAT 2263 (Princeton Applied Research) potentiostat. Linear sweep voltammetry (LSV) was carried out with carbon cloth as a counter electrode and a saturated calomel (SCE) reference electrode (CH Instruments). In order to evaluate the effectiveness of the electrodes on the membranes in a fuel cell, an electrode was fabricated on one side of the membrane and tested as a half-cell in a three electrode configuration. A one sided electrode membrane assembly (half-MEA) was placed between the two glass cells and the electrode was a working electrode [13]. The counter and reference electrode were placed on the opposite side of the working electrode so that the protons produced traveled through the membrane, as they would in an operating fuel cell. The compartment on the membrane side containing the counter and reference electrodes was filled with the 1 M $H_2SO_4$ solution for PEM electrode and 1 M NaOH for the AEM electrode. The working electrode side was filled with concentrated methanol for anodes and air (or $O_2$) for cathodes. The potential was cycled at least 10 times at a scan rate of 10 mVs⁻¹ until steady state voltammometric behavior was obtained. Linear polarization was performed at a scan rate of 1 mVs⁻¹ and IR compensation was used to correct uncompensated resistance.

PEM and AEM single cells were fabricated for testing the fuel cell performance. The fuel cell hardware was made of graphite with small holes for fuel diffusion. The graphite was used as the current collector. The total exposed area was 0.3 cm$^2$. The current from the I-V polarization curves was reported without normalizing because of the difference in the electrode area (2 cm$^2$) and the fuel exposed area. All MEAs were preconditioned by operating them as a fuel cell at a constant cell voltage of 400 mV for at least 2 hours before performing I-V polarization experiments. The scan rate was 1 mVs$^{-1}$. All tests were performed at an ambient pressure and temperature.

The electrode potentials of the AEM and PEM anode and cathodes were first investigated to examine the potential shift of the oxidation and reduction reactions with pH. The low pH electrode reactions were evaluated with an electrode fabricated with Nafion ionomer on a Nafion 117 membrane. The ionomer content was 30% of the mass of the carbon in the final dry electrode structure, which was previously optimized. The potential of zero current for the reduction of oxygen from air was 0.91 V, and 0.95 V for the reduction of pure oxygen. This is approximately 0.3 V negative of the standard potential for oxygen reduction. The potential of zero current for methanol oxidation at the PEM anode was between 0.22 V to 0.35 V. As the methanol concentration was increased from 0.5 M to 12.0 M, the potential of zero current shifted to more negative values.

The anode and cathode polarization curves for the AEM electrodes were investigated in a similar manner as the PEM electrodes. Two half-cell MEAs were fabricated using commercial a Tokuyama AMX membrane and the high IEC ionomer, H-AEM. The ionomer content was 30 wt % of the carbon in the final dry electrode structure. FIG. 4 shows the anode polarization curves under alkaline conditions, as in an AEM fuel cell for methanol concentrations of 1.0 M, 2.0 M and 4.0 M. The onset of the oxidation of methanol occurred at about −0.5 V. This value is 0.8 V negative of the oxidation of methanol under acidic conditions at the PEM anode due to the shift in pH, as shown in FIG. 3. At higher methanol concentration, the potential of zero current shifted to more negative potentials, just as with the PEM anode. Concentrations higher than 4.0M could not be used due to the solubility and swelling of the ionomer in the AEM samples. The potential of zero current for the reduction of humidified air and oxygen at the alkaline AEM cathode was 0.30V and 0.31V, respectively. The values are within 0.1 V of the standard potential for oxygen reduction under alkaline conditions, Eq.5.

The reduction of air at the AEM cathode is at essentially the same potential as the oxidation of methanol at the PEM anode. If used in a bi-cell configuration, where the high pH AEM air-cathode is shorted to the acid PEM anode, there is essentially no potential difference between the two electrodes, which mitigates the short circuit in an all-PEM bi-cell, as discussed in the introduction section.

On the other hand, the kinetics for methanol oxidation and oxygen reduction in alkaline media may be faster than in acid media. However, the beneficial effects of alkaline media is not reflected in the current density for oxidation and reduction in alkaline media, compared to acid media due to the immature electrode fabrication technology for AEM electrodes.

The effect of the ionomer content on the electrode potential of AEM anode was also investigated. Increasing the ionomer content from 10% to 50% shifted the potential of zero current to more negative values. The total hydroxide content and ionic pathway was increased with higher ionomer content inside of the electrode. However, when the ionomer content reached 70%, the potential of zero current shifted to more positive potentials. The methanol oxidation reaction occurs in the active surface area at the three-phase boundary of catalyst, reactant, and ionomer. With excess ionomer in the electrode, the reactants are obstructed from reaching the catalyst surface. Additionally, there was a negative shift in the oxidation potential with higher methanol concentration.

The effect of ionomer content on the catalyst activity for methanol oxidation was also investigated, in which the linear polarizations for methanol oxidation at the high pH AEM electrode as a function of the ionomer content were studied. In this experiment, the same ionomer, H-AEM, was used to find the optimum content. An ionomer content of 30% was shown to yield the highest peak current for methanol oxidation at 0.15 V vs. SHE, which is near the operating point of an alkaline AEM fuel cell. The poor performance of the 10% ionomer content is likely due to the lack of an adequate three-phase boundary. The poor performance at 50% and 70% ionomer was likely due to mass transfer limitations resulting in low catalyst activity.

Based on the optimized ionomer results shown above, an ionomer content of 30% was chosen for use in the electrodes for the alkaline, AEM fuel cell in the AEM-PEM bi-cell configuration. The first AEM fuel cell was fabricated with H-AEM ionomer as the membrane and as the ionomer in the electrode assembly. A passive fuel cell configuration (i.e. stagnant tank of 2.0 M methanol) was as the fuel at the AEM anode. The AEM cathode was open to the ambient air at room temperature and about 40% relative humidity. The open circuit voltage of the cell was 0.57 V, and a current of 1.4 mA was measured at a cell voltage of 0.4 V. In order to compare cell performance for electrodes with different ionomer content, a second AEM fuel cell was prepared with the lower IEC ionomer, L-AEM. The membrane electrode assembly had the same membrane as the first fuel cell, H-AEM. It was found that the L-AEM ionomer led to higher fuel cell performance. The open circuit voltage was 0.64 V and the current was 3.28 mA at 0.4 V. This is twice the current achieved with the H-AEM ionomer. Since H-AEM has a higher ionic conductivity and IEC, it is clear that the microstructure and water swelling in the electrode assembly are important factors, rather than simply ionic conductivity. The L-AEM ionomer has less water swelling due to its lower quaternary ammonium density than the H-AEM ionomer, which is the most likely cause of the performance difference between the two ionomers. It is common for membranes with a high degree of chloromethylation, and resulting quaternary ammonium content, to have higher conductivity and IEC, but also higher water uptake. High water uptake can result in flooding in the electrode which can impede the mass transfer of reactants inside the catalyst layer.

The AEM fuel cell was also tested in 4.0 M methanol with the L-AEM electrode assembly. Since there is no pressure difference across the membrane in a passive system (the fuel is not pumped to the anode), a higher methanol concentration can lead to higher performance, unless other factors, such as cross-over, become a factor. In this case, the performance of the L-AEM ionomer with 4.0 M methanol fuel was slightly worse (open circuit voltage of 0.67 V) than the 2.0 M methanol case.

Maintaining electrode-fuel contact is critical in liquid feed fuel cells, especially for portable devices which can be moved and rotated. Thus, it is desirable to use a wicking mechanism to keep the electrode assembly wet with fuel even when the device is inverted. This concern is especially true in the bi-cell configuration, as shown in FIG. 7, where the two electrodes are mounted opposing each other. In the AEM-PEM bi-cell configurations studied, hydroxy-methoxy cellulose (HMC)

was used in the fuel tank as a liquid wicking material. The single fuel cell performance with HMC was tested at different orientations: anode-side up, upside down and a 90 degree angle. Steady state performance was achieved at all three orientations; however, it is of interest to evaluate the performance under wicking conditions vs. no wicking conditions. Thus, the single fuel cell performance in 2M methanol was tested with or without HMC. It was found that the AEM fuel cell performance was same in all cases. Interestingly, the PEM fuel cell performance changed when HMC was used. The open circuit voltage of the PEM fuel cell was 0.1 V higher with HMC. The most likely cause of the improved performance was a decrease in cross-over with HMC due to the flow restrictions HMC causes. The methanol crossover in an AEM cell is lower than in a PEM cell because electro-osmotic is in the opposite direction. If a higher concentration of methanol (>2M) was used, the effect of fuel restriction by the HMC on the AEM cell is expected to be the same as the PEM case.

In one experimental embodiment of AEM-PEM bi-cell, an o-ring style glass joint was used to construct a fuel reservoir between the AEM and PEM fuel cells. The AEM and PEM fuel cells were 5 cm apart and the two anodes shared the common methanol fuel tank which included the HMC. Each cathode was open to the air on the outside of the assembly. The cells were operated at room temperature and humidity (ca. 40% relative humidity). The AEM cathode was shorted to the PEM anode. It was confirmed that there was no current flow between the AEM cathode and PEM anode.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A fuel cell, comprising:
   a. a cation exchange membrane having a first side and an opposite second side;
   b. a first anion exchange membrane having a first exterior surface and an opposite first interior surface disposed along at least a portion to the first side of the cation exchange membrane, a catalyst embedded along the first exterior surface; and
   c. a second anion exchange membrane having a second exterior surface and an opposite second interior surface disposed along at least a portion to the second side of the cation exchange membrane, a catalyst embedded along the second exterior surface.

2. The fuel cell of claim 1, wherein the cation exchange membrane comprises a material selected from a group consisting of: a polymer including a sulfonic group attached thereto, a composite, and combinations thereof.

3. The fuel cell of claim 1, wherein the cation exchange membrane comprises a sulfonated tetrafluoroethylene based fluoropolymer-copolymer membrane.

4. The fuel cell of claim 1, further comprising a first conductive mesh disposed along the first exterior surface of the first anion exchange membrane and a second conductive mesh disposed along the second exterior surface of the second anion exchange membrane.

5. The fuel cell of claim 4, further comprising:
   a. a fuel channel disposed adjacent to the first conductive mesh; and
   b. an oxidant channel disposed adjacent to the second conductive mesh.

6. The fuel cell of claim 4, wherein the first conductive mesh and the second conductive mesh each comprise a material selected from a group consisting of: a carbon paper, a carbon cloth, a metal mesh and combinations thereof.

7. The fuel cell of claim 1, wherein the catalyst comprises particles of a metal supported by carbon.

8. The fuel cell of claim 7, wherein the metal comprises a metal selected from a group consisting of: platinum, palladium, silver, nickel and alloys thereof.

9. The fuel cell of claim 1, wherein the catalyst comprises enzymatic moieties.

10. The fuel cell of claim 1, wherein at least one of the first side and the second side of the cation exchange membrane comprises an uneven surface.

11. The fuel cell of claim 1, further comprising a non-planar junction between the cation exchange membrane and at least a selected one of the first anion exchange or the second anion exchange.

* * * * *